United States Patent [19]

Easy et al.

[11] 4,069,481
[45] Jan. 17, 1978

[54] PULSE RADAR APPARATUS

[75] Inventors: Maurice Henry Easy, Maidenhead; Harry Donald Cramp; Peter Lambert Hartley, both of New Malden; Philip David Lane Williams, Banstead, all of England

[73] Assignee: Decca Ltd., London, England

[21] Appl. No.: 573,090

[22] Filed: Apr. 30, 1975

[30] Foreign Application Priority Data

May 1, 1974 United Kingdom ............... 19160/74

[51] Int. Cl.² .......................... G01S 7/06; G01S 7/22
[52] U.S. Cl. ............................ 343/6 TV; 343/5 EM
[58] Field of Search ......................... 343/5 EM, 6 TV

[56] References Cited

U.S. PATENT DOCUMENTS

| 2,490,268 | 12/1949 | Herbst | 343/6 TV |
| 3,543,269 | 11/1970 | Dudley | 343/5 EM |
| 3,569,966 | 3/1971 | Dunn et al. | 343/6 TV |
| 3,890,616 | 6/1975 | Kojzma et al. | 343/5 EM X |
| 3,893,110 | 7/1975 | Drake | 343/5 EM |
| 3,899,769 | 8/1975 | Honore | 343/5 EM X |

Primary Examiner—Malcolm F. Hubler
Attorney, Agent, or Firm—Edward F. Connors

[57] ABSTRACT

A pulse radar apparatus has video quantizing means for digitally encoding the received video signals at a first clock rate. The encoded video is fed into storage means, read out at a second clock rate, converted to analogue form and applied to a cathode ray tube to give a display, e.g. a P.P.I. display. The cathode ray tube has a constant time base speed and different range scales for the display are obtained by switching the speeds of writing into and/or reading out of the store. Multiple stores permit asynchronous reading and writing. Multi-level amplitude coding of the video amplitude is employed.

12 Claims, 2 Drawing Figures

PULSE RADAR APPARATUS

BACKGROUND OF THE INVENTION

1. Field of the Invention

This invention relates to pulse radar apparatus and to the displaying of information from such apparatus.

2. Prior Art

It is the common practice to display radar information from a pulse radar receiver using a brightness modulated cathode ray tube. Plan position displays produced in this way are widely used, for example, in marine radars as they provide a form of display which is readily understood by the observer. In marine radars, it is generally necessary to make provision for switching the time base speed to any one of a number of different values to give different range scales for the display.

It is known to digitize the radar video signal from a pulse radar receiver by repetitively sampling the video signal and determining, for each sample, whether or not a reflected pulse signal is present. Such digitized radar information can be processed using digital data processing techniques. Such digital processing of radar signals is widely used, for example, for aircraft control purposes.

However, in marine radar apparatus, it is generally necessary to provide a display which is switchable, in steps, to cover many different range scales. It is sometimes necessary to have a display having a large area and commonly a display of up to 48 nautical miles is provided. At the other extreme, a display covering only a small area, e.g. extending to only a fraction of a mile might be required. It has been the conventional practice on marine radars to effect the scale-changing of the display by switching the time-base speed of the time-base scan generator for a cathode-ray display tube. When the time-base speed is changed, the brightness of the display changes. Also it is the common practice to lengthen the duration of the transmitted pulse on longer range displays to improve visibility of the display.

SUMMARY OF THE INVENTION

It is one of the objects of the present invention to provide an improved method of and apparatus for displaying pulse radar information particularly facilitating range scale changing.

According to one aspect of the present invention, a method of displaying radar information, from a pulse radar receiver on a cathode ray tube comprises the steps of repetitively sampling and quantizing the amplitude of the received signals at a first clock rate, storing the quantized information in a store, reading out information from the store at a second clock rate and applying the read-out information as modulation on a scanned time base of the cathode ray tube. Conveniently the cathode-ray tube has a constant speed time-base trace and the rate of sampling and/or the rate of read-out is selected according to the range-scale of data to be displayed.

The invention furthermore includes within its scope pulse radar apparatus having a receiver for receiving and rectifying incoming signals wherein there are provided clock-controlled means for repetitively sampling and quantizing the amplitude of the received and rectified signals at a first clock rate, storage means for storing the quantized signals, a cathode ray display tube having a time base scanned over the face of the tube, and clock-controlled means for reading the stored signals at a second clock rate different from the first rate and applying them as a brightness modulaion to the time base. Preferably selector means are provided for adjustably controlling the relative rates of sampling and reading out from the store so that, with a constant-speed timebase, the effective range-scale of the display is adjustable.

As previously mentioned, in marine radar apparatus it is normally required that a display should be switchable to a number of different range scales and, in a conventional radar display, this requires the provision of a switchable time-base system providing a plurality of time bases at different speeds. With the high speed timebases, a very short duration transmitted pulse is required to give the best definition but for the longer range scales, in order to make the responses more clearly visible on the display, a longer duration transmitted pulse may be required. Thus in conventional radars, provision also has to be made for changing the duration of the transmitted pulse. Using the method of the present invention, a single time-base speed may be used to provide the trace on the cathode ray tube, the digitized radar signals being extracted from the store and applied as a brightness modulation to the trace, the data being applied to the trace at the appropriate speed dependent on the range scale to be displayed. Typically the time-base speed may correspond to that of a conventional radar range scale intermediate between the maximum and minimum to be displayed. Thus, for displaying information on a short range scale, the digital information would be read out from the store and applied, as a brightness modulation, at a slower speed than the information is fed into the store. For a longer range scale on the other hand, the information would be extracted from the store and applied as a modulation at a higher speed than the information is fed into the store. This technique overcomes the problems of lack of brilliance on short range scales, particularly on scales 1½ nautical miles and less. It has been found possible to use, on a 12 inch cathode ray tube, a display of a range of 1/16th of a mile. Heretofore this has only been possible using slow sweep frequency modulation radar techniques in order to decouple the spot speed of the cathode ray tube from the velocity of radio waves. For the longer range scales, the use of the stored digital information permits of repetitive display, for example two or three display traces being superimposed using the same information from the store. The radar will thus be appearing to operate at a higher pulse recurrence frequency than is really the case and it is thus possible to achieve the desired brilliance on the display despite the higher writing speed on the screen than would be the case in a conventional radar. It is thereby possible to make up for the viewing losses which would otherwise occur from the use of only a short duration radar pulse for the longer scale displays. Instead of having a repetitive display of the same information, it is possible alternatively to take the digitized output from the store through a pulse stretching circuit to lengthen the duration of the individual pulses and thereby making them more readily visible on the display. The higher level quantized signals can be selectively stretched, thereby discriminating against noise which predominately resides in the lower levels. Selective stretching of the top level or levels allows of a very precise setting of the radar gain control or clipper when a logarithmic receiver is used.

With the use of a single time-base speed, a single set of calibration signals may be provided, these being used for all the various range scales. The problems of time-base linearity are much more readily solved with a single time-base. Moreover the EHT for the cathode ray tube may now be derived using a deflection coil flyback technique as in television receivers. Heretofore this has not been possible in marine radar receivers because of the necessity for having time bases with different speeds and hence different flyback conditions.

The use of a constant speed time-base for the various range scales also makes easier the introduction of computer generated marks on the shorter ranges. More generally, the digital display can readily be made compatible with computer control systems and the timing of the display can be set by a computer with less demand on a computer interrupt than in a conventional system in which the timing of the display of the information is constrained by the timing of the radar pulses. The interfacing with a computer not only permits of this use of an asynchronous trigger for unloading the video stores but also permits of these stores being unloaded at a slower rate more compatible with slower computer operating speeds. In other words, the radar digitizer stores form buffers for this purpose.

The radar signals may be quantized at two levels, i.e. "signal" or "no signal", as in known techniques for digitising radar information. In some cases however it may be desirable to quantize the instantaneous sample amplitude in three or more amplitude levels and to store a digitally encoded indication of the amplitude level. A two-level digitized amplitude indicates the presence or absence of a signal and thus, on the display tube, if it is applied as a video signal, all signals are indicated at the same brightness level. In a marine radar, users are accustomed to having the additional information represented by the amplitude of the signal which determines the brightness of the response on the display. This extra information, to an experienced observer, conveys much useful information about the size and therefore the identity of targets.

Very conveniently, in the apparatus of the present invention, a three or a four-level quantizing system is employed.

By this technique, a number of important advantages are obtainable in the processing and display of radar information from a pulse radar. The amplitude level information may be used, for example, if the information is to be processed using digitial data processing apparatus. A brightness modulated display may be reconstituted from the digitized radar information, using digital-to-analogue converter means to reconstitute the video at the appropriate level corresponding to the quantized information. It is found, in practice, that using a four-level quantizing arrangement, the display, to an ordinary user, would appear similar to a conventional radar display in which the video signal is applied directly in an analogue form as a brightness modulation.

An interference suppressor may be provided including means for determining whether the signals are coherent at the pulse reference frequency and suppressing the non-coherent signals before applying information to the display. Digital integration may be provided to detect weak signals in clutter, for example by using an M out of N technique on the samples at any given range together with means for enhancing correlated signals.

A further advantage for marine radar is that, by using a single speed time-base, a heading marker may be produced using a similar time-base and hence will always be of the same width, conveniently 1 PRF line width. With the digital-to-analogue conversion of signals to provide the bias controlling the brilliance of the display, conveniently the brilliance of the heading marker is controlled digitally in the same way and hence can be set at any one of a number of levels corresponding to the number of brightness levels into which the radar signals are quantized.

DESCRIPTION OF THE PREFERRED EMBODIMENTS

Figure 1:
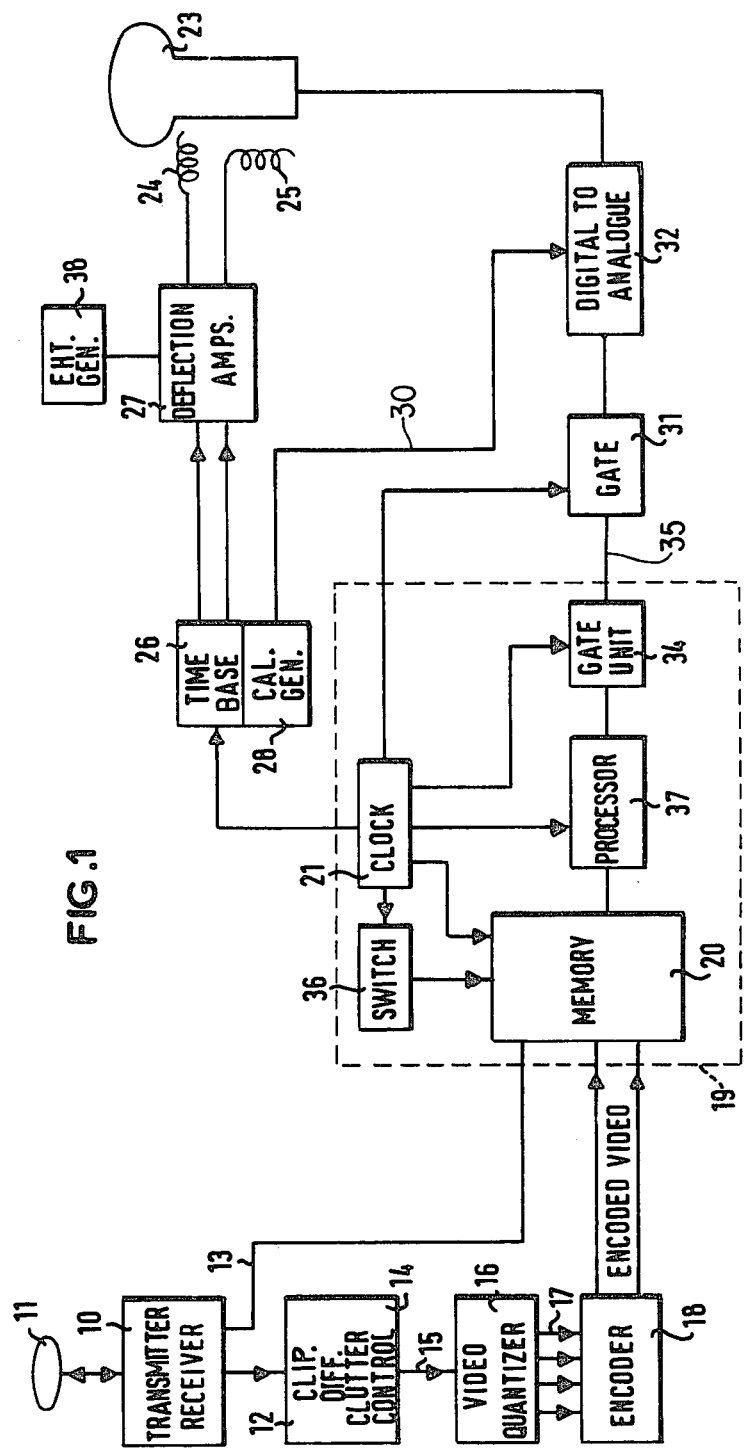
FIG. 1 is a block diagram illustrating a radar receiver and showing one embodiment of the invention.

Referring to FIG. 1 there is shown a pulse transmitter and receiver unit 10 with a scanning antenna 11. A video output is obtained on a lead 12 in the form of a rectified signal at video frequency and a trigger output is obtained on lead 13. The video signal may be fed through a signal processor 14 for clipping, differentiating and clutter control. The apparatus thus far described may be of known conventional construction. The output from the processor 14 is fed on a lead 15 to a quantizer 16 which consists essentially of amplitude comparators to provide outputs on leads 17 according to the amplitude level of the incoming video signal; in this particular embodiment, these outputs are provided on one or more of a number of the leads according to the amplitude. The signals on leads 17 are digitally coded in an encoder 18 to provide an encoded video which, in this particular embodiment, utilises a two-digit binary code to represent four different video levels. The coded video is fed into a digital processor 19 including a memory unit 20 which, in this particular embodiment, consists of a plurality of shift registers having a multi-phase drive system. A clock 21 provides the multi-phase drive and gives periodic sampling of the video signals at a regular repetitive rate corresponding to predetermined radar range intervals so that the radar video information is stored in the memory unit 20 in digitial form with a digitally coded amplitude level for each range sampled.

The radar information is displayed on a cathode ray tube 23 using video information obtained from the memory 20. The cathode ray tube has orthogonal deflection coils 24, 25 which are driven from a time base unit 26 having current amplifiers 27 providing the required drive currents for the deflection coils. The time base is a single speed time base. For a marine radar, the time base might be at a speed corresponding to a 6 mile display for a conventional plan position display tube. The time base is not synchronised with the radar trigger but is synchronised from the aforementioned clock 21 so as to be appropriately synchronised in accordance with the timing of the readout of video data from the memory 20. The time base generator 26 has an associated range calibration signal marker generator 28 providing a video output on a lead 30, this video output being in a digitally coded form corresponding to the digital coding of amplitude levels of the video signals. The lead 30 feeds the range marker signals into a gate unit 31 into which are also, as described later, fed video signals representing radar information. The output from the gate unit 31 is fed via a digital-to-analogue converter 32 to provide analogue output which is applied to the cathode of the tube 23 to provide brightness modulation for the trace on the tube 23.

If the radar information memory was read out from the memory at the same speed as it was put in, that is to say at a speed corresponding to the incoming radar information, and thence applied to the gate 31, the display on the tube 23 would have a range corresponding to the speed of the time base unit 26, that is to say six miles in this particular case. Longer range scales however are provided by reading out the information more quickly and typically for a marine radar, scales of 6, 12, 24 and 48 miles might be provided. This is effected by using a read-out gating circuit 34 driven from the clock source 21 to sample the memory at the appropriate rate, the sample signals being digitally coded signals representing the amplitude level which signals are fed on a lead 35 to the aforementioned gate 31. To avoid the lower brilliance which can occur on longer ranges, compared with a conventional radar display bearing in mind that the trace is speeded up compared with a conventional display, the gating circuit 34 may be arranged to read out the contents of the memory 20 two or three or more times in each pulse repetition interval. Thus the radar display will appear to be operating at a higher pulse recurrence frequency than is the radar. Alternatively however, since the video has been staticised, the output signals corresponding to higher level quantised components can be fed through a pulse stretching circuit to lengthen the display signals on the cathode ray tube which might come from discrete small targets or coast line and thereby make the signals more clearly visible.

The display is also arranged to provide short ranges for example, $\frac{1}{4}$, $\frac{1}{2}$, $\frac{3}{4}$, $1\frac{1}{2}$ and 3 nautical miles. This is achieved by reading out the information from the memory at a slower rate than it is put in. It will be immediately apparent that, with this arrangement, the time base speed does not have to be increased for these shorter ranges and hence there is no loss of brilliance compared with conventional displays where the requirement to obtain sufficient brilliance presents problems for short range radar displays. It is readily possible using the slow speed read-out from the memory 20 to obtain much shorter range displays than have hitherto been possible from marine radar; for example displays of a range of only 1/16th of a mile may be obtained if required. Selection of the radar display scale thus is obtained with this equipment by means of a selector switch 36 controlling the drive to the read-out gate 34.

If required a digital processor 37 may be provided for processing the information from the memory 20 before it is fed to the read-out gate 34 so that information on successive radar display traces is compared to suppress signals not coherent at the radar pulse recurrence frequency. This may be used for reducing interference from other radars. An M out of N technique may be used to effect digital integration of signals from successive traces so as to enhance correlated signals in noise and uncorrelated clutter.

Trace-to-trace correlation together with jitter on the radar trigger pulse time intervals enables "second trace" echoes of point targets to be completely eliminated. If there is sufficiently large jitter on the pulse repetition rate, even extended multiple trace land target echoes can be eliminated from the display.

Since only a single time base speed is used, the EHT for the cathode ray tube may be derived using a deflection coil flyback generator 38. This gives a substantial saving of total power consumed and heat dissipated in the display equipment. The avoidance of fast scans gives a substantial saving display power consumption compared with conventional displays in which power is required from the supply source to provide scanning reactive power which is subsequently dissipated in the deflection coil damping circuits. With the constant speed deflection which can be employed using the present invention, it is possible to use television type diode "economy" circuits. The reduced bandwidth requirements in both the video and the scanning circuits further enables economy to be made in component costs.

Heretofore, in radar apparatus, the satisfactory matching of the output of a logarithmic receiver to the input of a cathode ray tube display has been hampered by the poor dynamic range available at fast writing speeds. With the above-described construction, more effective harmonisation of the video output of a logarithmic receiver to the display input is now possible because of the greater dynamic range of the cathode ray tube due to slow writing speeds and precision of setting up quantising levels.

Figure 2:
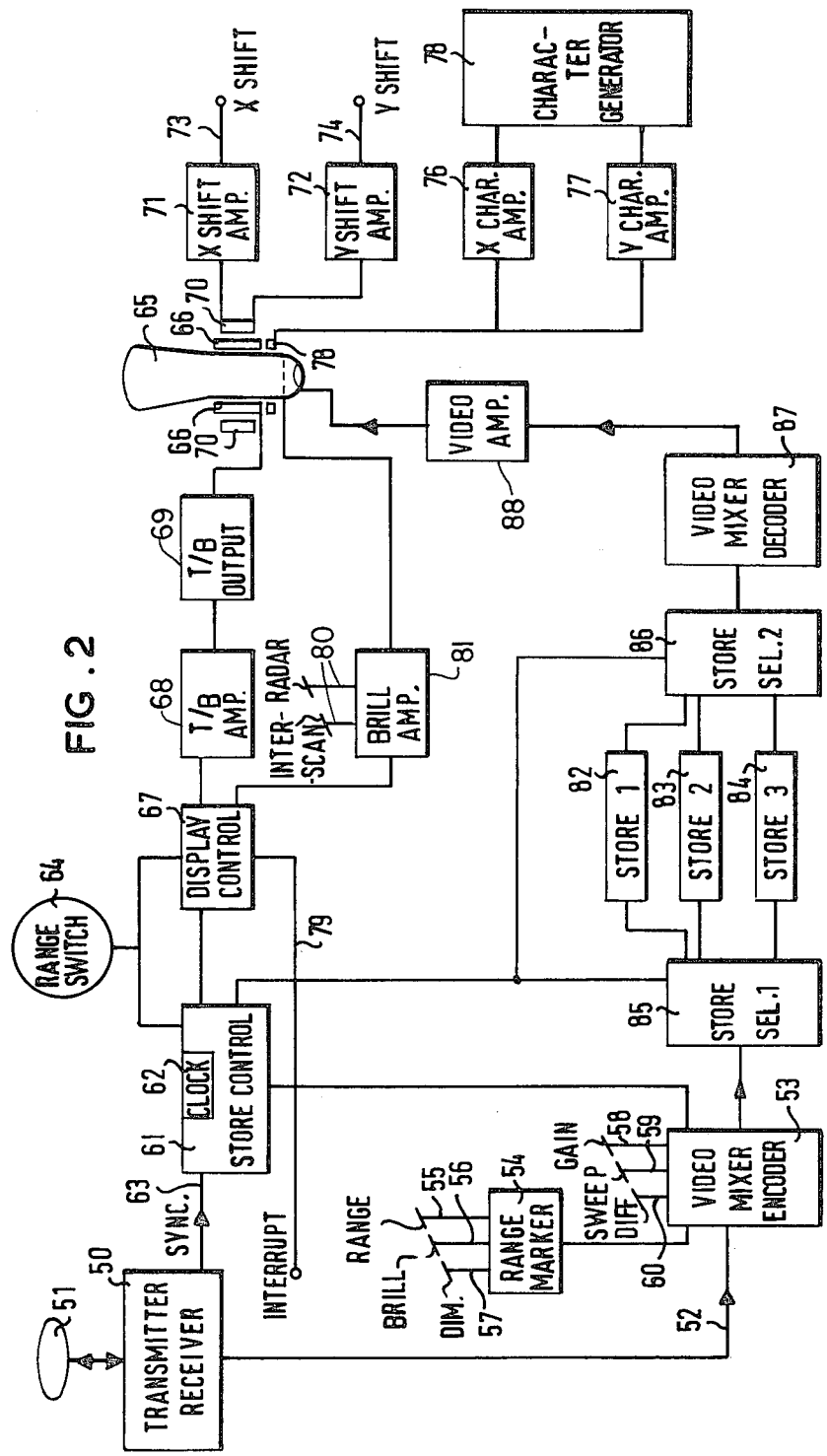
FIG. 2 is a block diagram illustrating a second embodiment of the invention.

FIG. 2 illustrates a second embodiment of the invention and shows a pulse radar having a transmitter/receiver 50 with a continuously directional aerial 51 producing rectified received video signals on a lead 52, which signals are fed to a video mixer and encoder 53. In unit 53 other signals are added including a range marker signal from a range marker generator 54 having a range control 55, brilliance control 56 and read-out control 57. Other signals, e.g. from an auxiliary video generator, may also be fed to the mixer and encoder 53 to be combined with the radar video. This mixer and encoder unit has a gain conrol 58, a swept gain control 59 and a differentiation circuit control 60 for controlling the gain, swept gain and differentiation of video signals in the known way. The encoder 53 also includes an amplitude sampler effecting repetitive amplitude sampling at three levels to provide digital video in a two-bit Gray code under the control of a store control unit 61 including a clock 62. The unit 61 has a synchronising signal input on lead 63 from the transmitter and is furthermore controlled by a range control switch 64 to effect sampling at a rate dependent on the selected range scale for the display. This particular radar apparatus is a marine radar with a 16 inch cathode ray display tube 65 and having 8 range scales from $\frac{3}{8}$ nautical miles to 48 nautical miles per radius on a plan position display. The tube 65 has a rotating coil 66 which is rotated in the known way in synchronism with the rotation of aerial 51. The trace is produced by a display control unit 67 feeding the coil 66 via a time base amplifier 68 and output unit 69, the synchronizing signal being fed from store control 61 to display control unit 67 so that the scanning is in synchronism with read-out of radar information as described below. Fixed coils 70 fed from X shift and Y shift amplifiers 71, 72 provide for shifting of the display under the control of X shift and Y shift input signals on leads 73, 74. Alphanumeric characters may be displayed in interscan periods by means of a character generator 75 coupled via X and Y amplifiers 76, 77 to fixed coils 78. The radar display can be interrupted by a signal on lead 79 and the brilliance of the radar and interscan displays are separately controlled by adjustable controls 80 on a brilliance amplifier 81 controlling the bias potential of tube 65.

The aforementioned storage means comprises three digital stores 82, 83, 84, selected by a store selector 85.

In operation one of the stores 82, 84, selected by the store selector unit 85, is made ready and, on receipt of a sync pulse from store control 61, is cycled through its addresses in the write mode. The clock frequency applied to the store is chosen to correspond with the required display range scale, thereby filling the store with digitized video signals such that there are in this embodiment, 1536 samples across the cathode ray tube diameter. On completion of the write cycle, the store selector unit 85 selects the next store to be filled when the next sync pulse occurs. This releases the store just filled for the reading process.

The store is read out at a rate equivalent to a 6 nautical mile radius range scale and at a repetition rate of approximately 3KHz. The timebase and brilliance amplifiers are gated on by display control 67 from store control 61 and the store is cycled through its addresses in the read mode feeding the digitized video via a second store selector 86, also controlled by store control 61, to a decoder in a video mixer and decoder unit 87. The decoded signals are then amplified by a video amplifier 88 and fed to the cathode ray tube as a brightness modulation.

The reading sequence is repeated at approximately 3KHz on the selected store until another store is released (by completing a write cycle) after receiving a sync pulse. The reading and writing systems are asynchronous, the former being controlled by a master crystal controlled oscillator and the latter by the radar pulse recurrence frequency. The radar pulse recurrence frequency must be equal to or less than the display repetition frequency to ensure that all the radar information is displayed.

The relationship between the read and write frequency will determine the number of times the stores are replayed before new data is available.

The range scales from 1½ to 48 nautical miles are generated by halving the write clock frequency for each increase in range scale. For the range scales below 1½ nautical miles the read clock frequency is halved with the write clock frequency set to the 1½ nautical mile rate. The read period is kept constant at the duration for 6 nautical miles per radius therefore the number of bits per diameter is reduced from 1536 on the 1½ nautical mile range and above to 768 bits per diameter on the 3/4 nautical mile range scale and 384 bits per diameter on the ⅜ nautical mile range scale.

The range marker output pulse from unit 54 is mixed with the radar video in unit 53 and fed via the store system, but the heading marker can be mixed after the store since it is not related to radar real time signals. Further signals can be added to the video in unit 87.

It will be noted that in this arrangement, a store is filled over a time period initiated by a radar synchronising pulse and at a bit rate controlled by the clock. As soon as a store is filled, i.e. after one radar pulse repitition period, writing is into another store. Read out is not synchronised with the writing but is at the repetition rate of 3KHz and at a bit rate controlled by the clock. Read out is always from the last-filled store and thus three stores are necessary; at any one time one is being loaded, data is being read from another and the third is required so that there is always a store free to receive data at the start of a radar cycle.

It will be noted that the display is bright due to the high read frequency and the fixed scan rate which slows down short range signals and stretches long range pulses to match display resolution. The display recovery time is reduced to the store change-over time, typically less than 1 microsecond. This allows all the interval between radar pulses to be displayed. Where the radar pulse repetition rate is less than 3KHz, alphanumeric information can be presented with no loss in radar information by suppressing repeat scans.

In the arrangement of FIG. 2, at long ranges, the number of range cells is adjusted to match the required resolution. At short ranges the range resolution is adjusted to match the scale length. Pulse stretching of the video signals before displaying is not therefore required. As with the construction of FIG. 1, the display is not synchronised with the radar, thereby facilitating the display of information other than radar data, e.g. under the control of a data processor.

We claim:

1. Pulse radar apparatus having a receiver for receiving and rectifying incoming radar video signals, wherein there are provided a cathode-ray display tube, a single speed time-base generator providing a time base trace on the screen of the cathode-ray tube, means for scanning the time base trace across the screen of the tube, clock-controlled means for repetitively samplying at a first clock rate and quantizing the amplitude of the received and rectified signals in successive periods between radar pulses, storage means for storing quantized signals from successive ones of said radar pulse periods, clock-controlled means for reading the signals from said store at a second clock rate and applying them as a brightness modulation to said time base, range selector means adapted for selectively adjusting said first clock rate of said sampling means to effect alteration of the relative clock rates, whereby to effect changes of displayed range on the cathode-ray tube screen, and means controlling said reading means to repeat reading the previously read signals from the store in synchronism with said single speed time base generator to provide repeated substantially identical scans on the cathode-ray tube screen until the beginning of the next radar pulse period.

2. Pulse radar apparatus as claimed in claim 1 and having electro-magnetic deflection coils for producing the time base trace on the cathode ray tube and having a line scan fly-back type of E.H.T. generator to provide E.H.T. for the cathode ray tube.

3. Pulse radar apparatus as claimed in claim 1 wherein means are provided for quantising and digitally encoding the instantaneous sample amplitude in at least three amplitude levels, said storage means being arranged to store the digitally encoded indication of the amplitude level and wherein a decoder receiving read-out information from the store is arranged to control the instantaneous brightness of the display in accordance with the encoded level of information read out from the store.

4. Pulse radar apparatus as claimed in claim 3 wherein said means for quantising and digitally encoding the sample amplitude is arranged to quantise the information at four levels.

5. A method of displaying radar information, from a pulse radar receiver, on a cathode ray tube comprising the steps of repetitively sampling and quantizing the amplitude of the received signals at a first clock rate, storing the quantized information in a selected one of at least three stores, sequentially selecting a different one of the stores in synchronism with the radar pulse recurrence frequency, whereby quantized video information received in each successive radar pulse repetition period is stored in the different most recently selected one of the stores, reading out the information stored in the last previously selected one of the stores at a second clock rate and at a repetition rate which is asynchronous with the radar pulse recurrence frequency, and applying the read-out information as modulation on a scanned time base of the cathode ray tube.

6. A method as claimed in claim 5 wherein the cathode-ray tube has a constant-speed time-base trace and wherein the rate of sampling and/or the rate of read-out is selected according to the range-scale of data to be displayed.

7. A method as claimed in claim 5 wherein the radar information is quantised in at least three amplitude levels.

8. Pulse radar apparatus having a receiver for receiving and rectifying incoming signals and including clock-controlled means for repetitively sampling and quantizing the amplitude of the received and rectified signals at a first clock rate, at least three store units, each adapted to store, when selected, the quantized information, store control means arranged to select a different one of the store units sequentially in synchronism with the radar pulse recurrence frequency, whereby quantized video information received in each successive radar pulse repetition period is stored in the different most recently selected one of the stores, a cathode ray display tube having a time base scanned over the face of the tube, and clock-controlled means for reading the stored information at a second clock rate and at a repetition rate which is asynchronous with the radar pulse recurrence frequency, and applying the information as a brightness modulation to the time base, the store control means being further arranged to switch the reading means so that information is read from the last previously selected one of the stores.

9. Pulse radar apparatus as claimed in claim 8 wherein the store control means are arranged to control the read-out to be repetitive from a store unit until the end of a read out cycle after another store unit has been completely filled with radar data and then to switch the read out to the newly filled store unit.

10. Pulse radar apparatus as claimed in claim 8 and having selector means for adjustably controlling the relative rates of sampling and reading out from the store so that, with a constant spaced time-base, the effective range-scale of the display is adjustable.

11. Pulse radar apparatus as claimed in claim 10 wherein said selector means comprise means for selecting any one of a plurality of sampling rates to adjust said first clock rate.

12. Pulse radar apparatus as claimed in claim 10 wherein said selector means comprise adjustable read-out means for selecting any one of a number of read-out rates for reading information from the store.

* * * * *